United States Patent
Kaplan

(10) Patent No.: US 7,403,839 B1
(45) Date of Patent: Jul. 22, 2008

(54) WATER SHUT-OFF SYSTEM

(76) Inventor: Joshua Kaplan, 2323 Westwood Ave., Richmond, VA (US) 23230

( * ) Notice: Subject to any disclaimer, the term of this patent is extended or adjusted under 35 U.S.C. 154(b) by 0 days.

(21) Appl. No.: 11/641,211

(22) Filed: Dec. 19, 2006

(51) Int. Cl.
G05D 7/00 (2006.01)
G05D 11/00 (2006.01)
F17D 5/02 (2006.01)
F17D 3/00 (2006.01)
F16K 31/12 (2006.01)
F16K 31/36 (2006.01)
F16K 31/48 (2006.01)
G01H 3/00 (2006.01)
G01N 29/00 (2006.01)
G01F 23/00 (2006.01)
G01F 17/00 (2006.01)
G01L 7/00 (2006.01)
G01N 11/00 (2006.01)
G06F 19/00 (2006.01)
G05B 23/02 (2006.01)
G08B 21/00 (2006.01)
G08B 5/22 (2006.01)
G08C 19/00 (2006.01)

(52) U.S. Cl. ............... 700/282; 137/15.11; 137/487.5; 137/624.12; 73/592; 116/109; 340/605; 340/825.36; 340/825.72; 340/3.43; 340/3.7; 702/51; 702/188

(58) Field of Classification Search ............... 700/282; 73/40, 46, 592; 137/15.11, 312, 78.1, 78.2, 137/78.3, 15.03, 38, 39, 315.06, 487.5, 624.11, 137/624.12; 116/109; 702/51, 188; 340/500, 340/605, 825, 825.36, 870.01, 870.11, 870.16, 340/3.1, 3.43, 3.7, 3.9, 825.69, 825.72
See application file for complete search history.

(56) References Cited

U.S. PATENT DOCUMENTS

| | | | | |
|---|---|---|---|---|
| 3,910,300 A | * | 10/1975 | Tal | 137/78.3 |
| 5,038,820 A | | 8/1991 | Ames | |
| 5,349,985 A | * | 9/1994 | Fischer | 137/607 |
| 6,025,788 A | * | 2/2000 | Diduck | 340/870.16 |
| 6,123,093 A | | 9/2000 | D'Antonio | |
| 6,337,635 B1 | * | 1/2002 | Ericksen et al. | 340/825.69 |
| 6,705,340 B1 | * | 3/2004 | McGill et al. | 137/315.06 |
| 6,938,280 B2 | * | 9/2005 | Wawrla et al. | 4/304 |
| 6,938,637 B2 | * | 9/2005 | McGill et al. | 137/39 |
| 7,032,435 B2 | * | 4/2006 | Hassenflug | 73/46 |
| 7,044,154 B2 | * | 5/2006 | Henderson et al. | 137/312 |
| 7,224,080 B2 | * | 5/2007 | Smedstad | 290/43 |
| 7,358,626 B2 | * | 4/2008 | Gardner et al. | 307/40 |

(Continued)

FOREIGN PATENT DOCUMENTS

JP     2003105818 A  *  4/2003

OTHER PUBLICATIONS

State Farm Insurance Website describing water leak detection systems.

*Primary Examiner*—Crystal Barnes Bullock

(57) ABSTRACT

A moisture monitoring and control system comprising: 1) a plurality of moisture sensors; 2) one or more local or remote control stations capable of monitoring and controlling each of the individual elements of the moisture monitoring and control system; 3) at least one water control valve capable of turning off the water supply to all or at least one water supply zone and powered by an aerogel capacitor; and 4) a plurality of non-interfering RF communications devices at each of the sensor, control and water control valve locations.

1 Claim, 1 Drawing Sheet

U.S. PATENT DOCUMENTS

| | | | |
|---|---|---|---|
| 2002/0033759 A1* | 3/2002 | Morello | 340/605 |
| 2005/0083020 A1* | 4/2005 | Baarman | 320/166 |
| 2005/0275547 A1 | 12/2005 | Kates | |
| 2007/0181186 A1* | 8/2007 | Walter | 137/312 |
| 2007/0277879 A1* | 12/2007 | Anderson et al. | 137/78.3 |

* cited by examiner

WATER SHUT-OFF SYSTEM

FIELD OF THE INVENTION

The present invention relates to moisture sensing systems and more particularly to such systems for the protection of buildings from flooding.

BACKGROUND OF THE INVENTION

The threat of damage from water to a structure whether it be a commercial building, multi-family residence or private home is one that has and continues to be a significant concern to owners and occupiers of such structures. While it is virtually impossible to protect against flooding due to natural occurrences such as hurricanes, torrential rains that cause stream flooding etc., many systems have been developed and marketed for the protection of structures against water damage due to, for example, freezing or breaking pipes, leaking appliances and the like.

Such prior art systems generally comprise: multiple battery powered or hard wired with battery back-up RF communicating moisture or water sensors; hard wired, battery powered or hard wired and battery backed-up water shut off control valves; a hard wired, battery powered or hard wired and battery backed-up central console capable of receiving information from the multiple sensors and transmitting instructions to a central water shut-off valve and passing information to one or more remote monitoring systems.

Representative of such prior art systems are those described in the following U.S. patents and patent Publications: U.S. Pat. No. 6,123,093; U.S. Pat. No. 5,038,820; US2005/0275547; U.S. Pat. No. 6,025,788; and US 2002/00332759 as well as many commonly available publications and safety websites such as that produced and distributed by State Farm Insurance relating to Water Detection Systems at its website.

While these prior art systems have proven highly satisfactory in many applications, a common weakness shared by all of them is the inability of the property owner or occupier to monitor, control, activate/deactivate, modify, and overall operate and customize the operation and configuration of each of the individual elements of the system individually to meet specific, generally temporary, requirements such as deactivating a specific sensor because of maintenance being performed on a specific appliance or deactivation of the central water control valve operating mechanism during similar operations.

Additionally, such prior art systems often utilized RF communication systems that could interfere with other neighboring systems such as might be found in an apartment or condominium setting, or had to rely on hard wiring of the valve control hardware or the use of very powerful high amperage battery systems because of the inability of conventional battery power to deliver the peak power required to activate a water control valve driver.

There thus remains a need for a water/moisture detection system and control system that, while performing the sensing and control functions of prior art devices, allows for complete operator control and monitoring of the entire system from one or more control elements, provides RF communication between the various elements of the system without the potential for interference with neighboring systems and permits the use of relatively small yet powerful power sources for meeting the relatively high peak power demands required for the activation of water control valves.

OBJECTS OF THE INVENTION

It is therefore an object of the present invention to provide a moisture monitoring and control system that provides the capability to monitor and control each of the elements thereof from one or more control stations or locations.

It is another object of the present invention to provide a moisture monitoring and control system that utilizes an RF communication system and protocol that allows for interelement communication without the possibility of interference with neighboring such or similar systems.

It is yet another object of the present invention to provide a moisture monitoring and control system that utilizes a highly efficient and high peak power generating power source for driving the water control valve or other elements of the system.

SUMMARY OF THE INVENTION

According to the recent invention, there is provided a moisture monitoring and control system comprising: 1) a plurality of moisture sensors; 2) one or more local or remote control stations capable of monitoring and controlling each of the individual elements of the moisture monitoring and control system; 3) at least one water control valve capable of turning off the water supply to all or at least one water supply zone preferably powered by an aerogel capacitor; and 4) a plurality of non-interfering RF communications devices at each of the sensor, control and water control valve locations.

DETAILED DESCRIPTION

Figure 1:
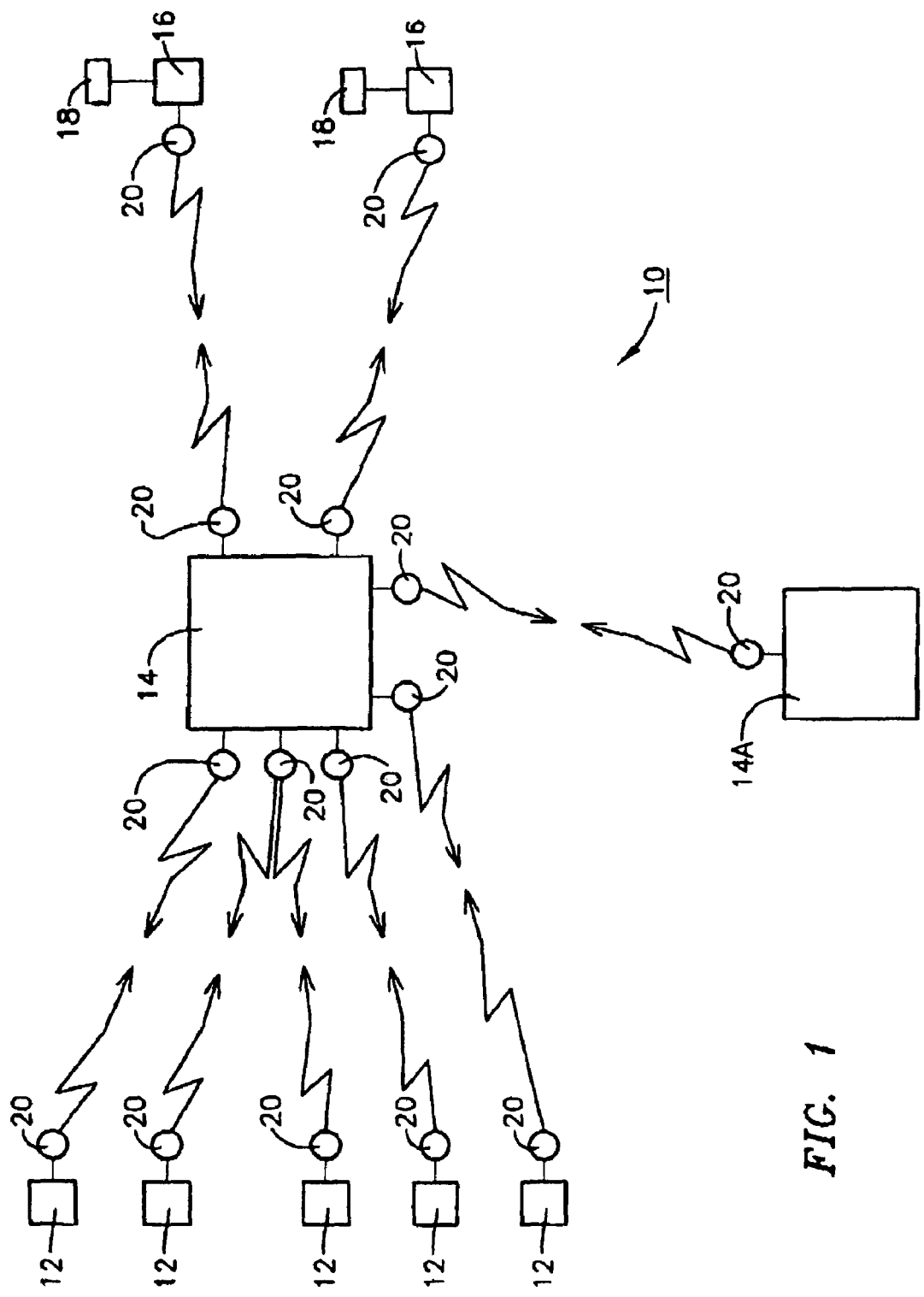
FIG. 1 is a schematic representation of the moisture monitoring and control system of the present invention.

Referring now to the accompanying drawings, as shown in FIG. 1, the moisture monitoring and control system 10 of the present invention comprises: 1) a plurality of moisture sensors 12; 2) at least one control station 14 capable of monitoring and controlling each of the individual elements of the moisture monitoring and control system; 3) at least one water control valve 16 capable of turning off the water supply to all or at least one water supply zone preferably powered by an aerogel capacitor 18 as described more fully below; and 4) a plurality of non-interfering RF communications devices 20 at each of the sensor, control station and water control valve locations, 12, 14 and 16 respectively, providing two way communication between control station(s) 14 and 14A and each of moisture sensors 12 and control valve(s) 16.

The art is replete with examples of moisture/water sensors 12 that can be used in the successful practice of the present invention, any such prior art device is contemplated for use in the present invention as long as they are capable of producing an indication of the presence of moisture/water that can be converted into a transmittable RF signal. Such sensors 12 can be located in any area where one might anticipate water leakage such as under appliances such as clothes washers, dishwashers, water heaters etc. as well as below sinks, bathtubs, showers and the like. Similarly, such sensors 12 can be located in areas where freezing of pipes might occur, or one of the moisture sensors can be replaced with a temperature sensor that would detect when the temperature in a structure or in the environs of a water pipe reaches a level where freezing might occur. Such sensors 12 can be hard wired into the electrical supply of the structure or battery operated, but are preferably hard wired and include a battery backup in the event of a power failure, a condition where flooding is more likely.

Control stations 14 and 14A form the heart of the moisture detection and control system of the present invention and differ from those of the prior art in that they include numerous, control and monitoring capabilities that prior art systems did not incorporate. Control stations 14 and 14A may be located within the structure being monitored and controlled or remote therefrom as in the case, for example, where system 10 is used to monitor and control moisture in a summer home or warehouse that is not continuously occupied. Such an arrangement with a first control station 14 located locally and a second control station 14A located remotely is shown in FIG. 1. Control stations 14 and 14A thus, preferably comprise a computer, programmable controller or other similar device that can: monitor all of the various elements of system 10 at all times; receive and transmit information regarding the need to shut down the water supply to one or more zones within a monitored structure or location; permit the input for or on a regular schedule submit queries as to the status of various elements of system 10, i.e. battery power level, active or inactive status, etc.; visually and/or audibly display status and response information; and allow for the input of manual override of selected sensors 12, valve controls 16 etc. as may be dictated by the needs of the user. Again, control stations 14 and 14A can be hard wired or battery powered, but are preferably hard wired with battery backup to provide for the event of a power failure.

As shown in FIG. 1, each of sensors 12, control stations 14 and 14A and valve controls 16 are equipped with a non-interfering communications device 20 that allows for two way RF communication between and among the various elements of system 10. Such devices utilize so-called ZIGBEE® communication protocols and modules that, through the operation of integrated hardware and software, provide unique and non-interfering communications between devices that have been "tuned" or taught a unique communications protocol that will not interfere with any neighboring RF communication devices. The "teaching" of the unique identifier used for any particular pair of devices, or for a complete system, can be accomplished through direct contact between communicating devices or even through infrared "contact" between such devices as is known in the art. The use of such devices provides for the easy and rapid replacement of individual sensors as well as communication and control valves since the replacement device can be "taught" the appropriate communication protocol by simple direct or infrared contact with the its related sending or receiving device. Preferred such communication devices used in the present invention are the XBee and Xbee Pro modules marketed by Maxstream, Inc., 355 South 520 West, Suite 180, Lindon, Utah 84042.

While remote control station 14A is depicted in FIG. 1 as using the above-described RF communications modules and protocols, it will be readily apparent that depending upon the distance between control stations 14 and 14A, communication between such devices may be via land line, cell phone or even internet connection.

In similar fashion, any number of powered control valve mechanisms are useful for use in control valves 16, and many of these are well know and extensively described in the prior art. According to a preferred embodiment of the present invention ball valves or throttle valves are used in this application. Again such devices can be hard wired to provide the power necessary power to operate such valves, but these devices are preferably powered by so-called aerogel "super capacitors" charged by a resident battery. "Super" capacitors of the type useful in the present invention are the so-called Powerstor® family of aerogel capacitors commercially available from Cooper Electronics Technology, 3601 Quantum Boulevard, Boyton Beach, Fla. 33426 and the Boostcap® family of "Ultra—Capacitors" commercially available from Tecate Industries, 12889 Gregg Court, Ponay, Calif. 92064 and manufactured by Maxwell Technologies, 9244 Balboa Ave., San Diego, Calif. 92123.

A practical difference between batteries and the preferred super capacitors of the present invention resides in their voltage behavior during charge and discharge. While batteries tend to charge at a prescribed voltage and a relatively high current and hold their chemistry-defined cell voltage during both charge and discharge, the super capacitors follow the simple linear formula for all capacitors with voltage varying linearly with charge as well as discharge. Thus while a battery will supply power at a constant voltage and relatively constant power level, operation of a device such as valve 16 may require a peak power output for which a battery is not capable, but for which an aerogel capacitor of the type just described is optimally suited. Thus, a "super capacitor" 18 that is charged either via a hard wired connection through a transformer or by a battery resident in the valve operating mechanism is optimally suited for this application and its use is specifically preferred in the present invention.

Such "super capacitors" and the related charging apparatus may also be used to power control stations 14 and 14A.

Thus in its application, when moisture is sensed by one or more of sensors 12 a signal is transmitted via communication device 20 to control station 14. If corrective action is required such as the shutting down of a control valve 16, this message is transmitted to the appropriate control valve 16 via communications device 20 and that valve 16 actuated by power derived from power supply 18. With the apparatus described herein, the user can solicit status information by manual or scheduled query from each of the sensors and control valves, temporarily or permanently disable one or more of the sensors or control valves, initiate operation of a specific control valve or control any other function of moisture monitoring and control system 10.

As the invention ahs been described, it will be apparent to those skilled in the art that the same may be varied in many ways without departing from the spirit and scope thereof. Any and all such modifications are intended to be included within the scope of the appended claims.

What is claimed is:

1. A moisture monitoring and control system comprising:
   A) a plurality of moisture sensors;
   B) one or more local or remote control stations;
   C) at least one water control valve powered by an aerogel capacitor capable of turning off the water supply to all or at least one water supply zone; and
   D) a plurality of non-interfering RF communications devices at each of the sensor, control and water control valve locations each comprising a small low power digital radio module using communication protocols based upon the I.E.E.E. 802.15.4 standard providing two way communication between these devices, wherein: said one or more control stations are capable of monitoring, querying and controlling each of the sensors and control valves and displaying or reporting the status of each of the sensors and control valves visually or audibly; and said non-interfering RF communications devices are taught their unique identifier through direct electrical contact between communicating sensors, control stations and control valves or through infrared contact between such devices.

* * * * *